(12) United States Patent
Andou et al.

(10) Patent No.: US 6,284,188 B1
(45) Date of Patent: Sep. 4, 2001

(54) PROCESS FOR PRODUCING CORDIERITE HONEYCOMB STRUCTURAL BODY AND HONEYCOMB STRUCTURAL BODY MOLDING AID

(75) Inventors: Yosiyasu Andou, Nogoya; Kazuhiko Koike, Nishio; Tomohiko Nakanishi, Kariya, all of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/348,013

(22) Filed: Jul. 6, 1999

(30) Foreign Application Priority Data

Jul. 7, 1998 (JP) .................................................. 10-207129

(51) Int. Cl.⁷ ........................ C04B 35/195; C04B 35/632
(52) U.S. Cl. ........................ 264/631; 264/630; 264/669; 264/670; 264/177.12
(58) Field of Search .................................. 264/630, 631, 264/670, 177.12, 669

(56) References Cited

U.S. PATENT DOCUMENTS 4,293,514 * 10/1981 Wada .................................. 264/630
5,997,984 * 12/1999 Koike et al. ......................... 264/630

FOREIGN PATENT DOCUMENTS

| 58-135169 | 8/1983 | (JP) . |
| 7-138076 | 5/1995 | (JP) . |
| 8-112528 | 5/1996 | (JP) . |
| 10-174885 | 6/1998 | (JP) . |

\* cited by examiner

Primary Examiner—James Derrington
(74) Attorney, Agent, or Firm—Pillsbury Winthrop LLP

(57) ABSTRACT

There is provided a process for obtaining a cordierite honeycomb structural body with thin cell walls and no molding defects such as cell breakage or the like. Cell breakage is prevented by limiting the maximum particle size of the cordierite starting material powder to no greater than 85% of the slit width of the extrusion molding die so that the starting material particles will not clog inside the slits or the introduction port of the slits. As one cordierite starting material, talc with a mean particle size of 5 μm or greater is used to give a honeycomb structural body with a void volume of greater than 30%, for production of a honeycomb structural body, with good moldability, having a small thickness and a low heat capacity. It is preferred to add to the starting material at least a lubricant/humectant, a binder and/or a mixture of a water-soluble polyhydric alcohol derivative and a polyhydric alcohol.

4 Claims, 4 Drawing Sheets

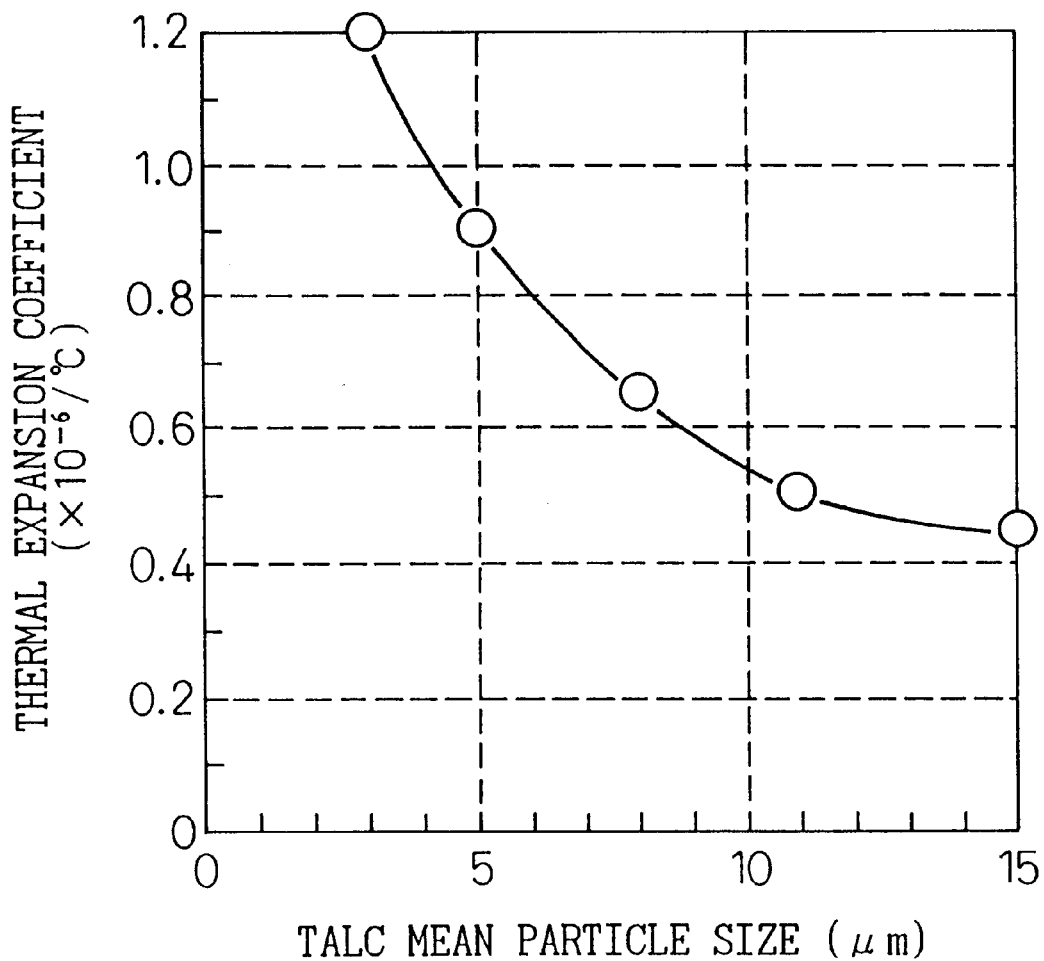

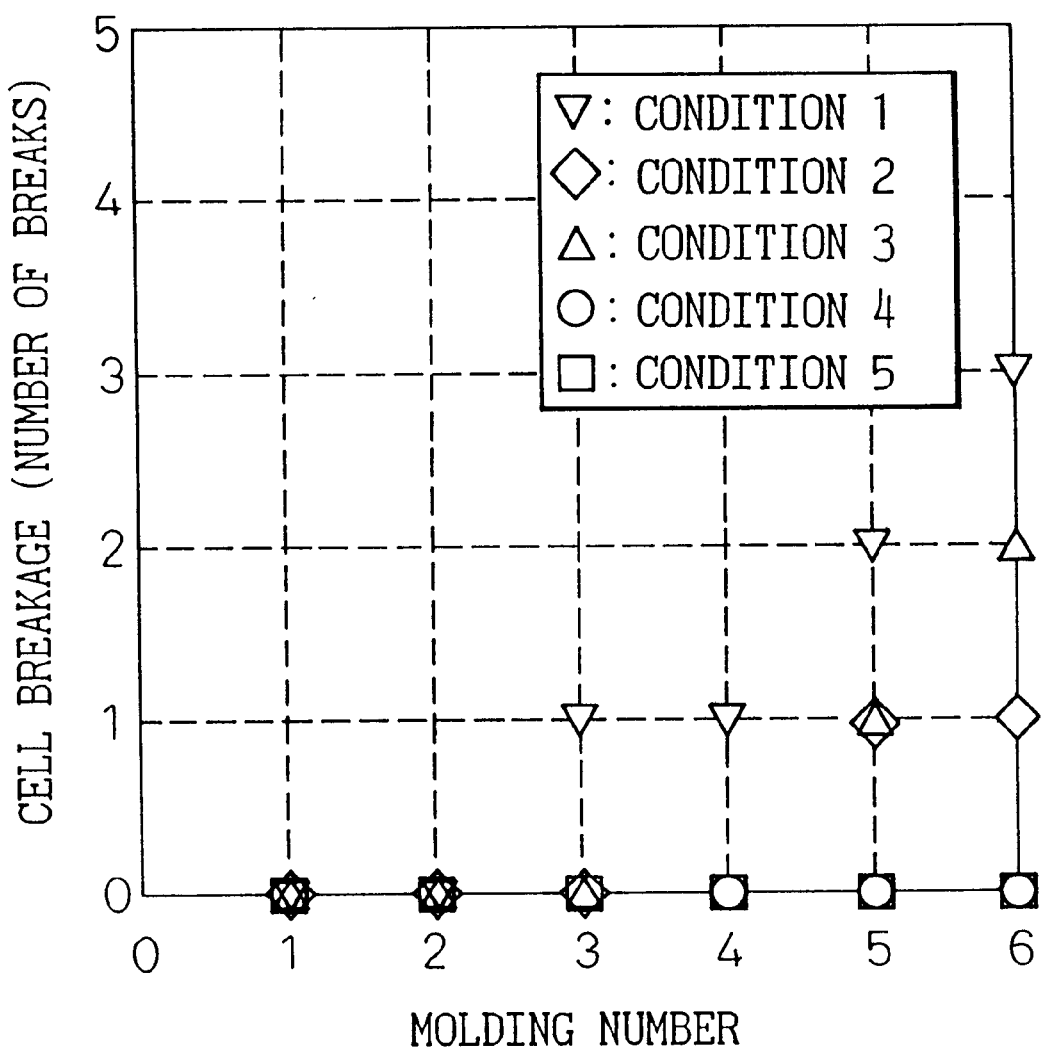

PROCESS FOR PRODUCING CORDIERITE HONEYCOMB STRUCTURAL BODY AND HONEYCOMB STRUCTURAL BODY MOLDING AID

BACKGROUND OF THE INVENTION

1. Field of the Invention

The present invention relates to a process for producing a cordierite honeycomb structural body used as a catalyst carrier for an exhaust gas purification catalyst in an automobile engine such as an internal combustion engine, and to a molding aid used for molding of the honeycomb structural body.

2. Description of the Related Art

With the toughening of exhaust gas standards for automobile engines in recent years, there has been a demand for more rapid activation of exhaust gas purification catalysts in order to reduce hydrocarbon emissions immediately after engines are started. One means of rapid activation of catalysts that has been considered is to lower the heat capacity by reducing the thickness of the cell walls in cordierite honeycomb structural bodies acting as catalyst carriers, but with narrowing of the cell walls, an inconvenience has resulted as the cell walls break during extrusion molding of the honeycomb structural body. This occurs because coarse grains in the starting material of the honeycomb structural body clog the lattice-like slits or introduction port of the extrusion mold for molding, thus inhibiting provision of the starting mixture, and this requires prior removal of the coarse grains in the starting material.

As concerns the particle size of the starting material powder, Japanese Unexamined Patent Publication No. 8-112528 teaches that lattice defects of molded bodies can be reduced by limiting the ratio (maximum particle size of starting material powder)/(slit width of extrusion mold for molding) to ⅓. However, because honeycomb structural bodies formed under these conditions have low void volume, the effect of reduced heat capacity is less significant, while the catalyst carrier property is also weaker. In addition, because of a larger thermal expansion coefficient, there is also a problem of lower thermal shock resistance.

Narrowing the cell walls of a honeycomb structural body also tends to result in molding defects known as cell wrinkles in the honeycomb structural body. These will be explained below. When a honeycomb structural body is extrusion molded, the starting mixture is first molded into a round bar form, and the round bar is extrusion molded into a honeycomb form. A screw-type tug mill such as shown in FIG. 1A is usually used for the round bar molding, in order to obtain a homogeneous round bar of the starting mixture for molding. A screw-type tug mill has upper and lower level screws 1, 2, and is provided with a vacuum chamber 3 and a strike-through roller 4 between the upper level screw 1 and the lower level screw 2. A resistance plate 5 is fitted in front of the lower level screw to create a uniform flow of the starting mixture and, as shown in FIG. 1B, the resistance plate 5 has a structure with a plurality of round holes 5 opened in a disk. The starting mixture which is kneaded by the upper and lower screws 1, 2 and passes through the resistance plate 5 is thus converted into a plurality of bar-shaped bodies which are introduced into a round bar mold 6 and are bonded together into a round bar as the cylinder size of the mold 6 narrows toward the tip.

The starting mixture used for molding of the round bar has conventionally been a cordierite-converted starting material of talc, kaolin, etc. with a water-soluble polyhydric alcohol added as a molding aid, but the cohesion is insufficient between the starting mixture after it has passed through the resistance plate 5 of the screw-type tug mill, and a starting mixture interface corresponding to the shape of the resistance plate 5 is formed on the round bar. This starting mixture interface presents almost no problem when molding a ceramic honeycomb structural body with a cell wall thickness of 100 $\mu$m or greater, and causes no visible molding defects. When the cell wall thickness is less than 100 $\mu$m, however, it has been found that cell wrinkles are generated at the sections corresponding to the starting mixture interface, wherein the cells of the ceramic honeycomb structural body ripple in the direction of extrusion. It is thought that this is caused because the thin cell wall results in a higher molding pressure, leading to precipitation of moisture, etc. at the starting mixture interface and greater flowability of the starting mixture near the interface; thus the difference in the flowability at the other sections where the flowability of the starting mixture does not change produces a change in the cell formation rate of the ceramic honeycomb structural body, thus leading to generation of the cell wrinkles.

Japanese Unexamined Patent Publication No. 7-138076 discloses a method of adding emulsified wax and methyl cellulose, as molding aids for reduced frictional resistance between the starting mixture and the mold wall surface, to improve molding defects such as stripping of the outer perimeter surface or cell wrinkles in ceramic honeycomb structural bodies. With this method, however, it has not been possible to eliminate the starting mixture interfaces on round bars, and thus a difference in flowability between the starting mixture interface and the other sections is produced. Consequently, while some effect of fewer cell wrinkles is seen by lowering the frictional resistance between the starting mixture and the mold wall surface, it is not possible to completely eliminate cell wrinkles.

The prior art processes, therefore, have been associated with the problem of molding defects such as cell breakage and cell wrinkles when the cell wall thicknesses of cordierite honeycomb structural bodies are reduced. It has also been necessary to position the catalyst carrier as close as possible to the engine in order to take advantage of the engine exhaust gas temperature for rapid activation of the catalyst. However, positioning the catalyst carrier close to the engine leads to the problem of cracking due to thermal shock as the catalyst carrier is exposed to sudden temperature variations. Improving the thermal shock resistance of the catalyst carrier requires a reduction in its thermal expansion coefficient, and specifically, to prevent cracking near the engine it is necessary for the cordierite honeycomb structural body to have a thermal expansion coefficient of $1.0 \times 10^{-6}/^\circ$C. or smaller.

It is therefore an object of the present invention to obtain a honeycomb structural body with a low cell wall thickness, with good moldability, wherein cell breakage is prevented without reducing the void volume and cell wrinkles caused by the starting mixture interface formed on the round bar are prevented, and to obtain a honeycomb structural body with excellent thermal shock resistance having a thermal expansion coefficient of $1.0 \times 10^{-6}/°$ C. or smaller.

The first aspect of the invention, designed to solve the problem of cell breakage when the cell wall thickness has been reduced, is a process for producing a honeycomb structural body composed mainly of cordierite which comprises adding a molding aid to a powder of a cordierite starting material, kneading the mixture and extrusion molding it with an extrusion molding die with honeycomb-shaped slits, and then firing it, the process being characterized in that the maximum particle size of the powder of the cordierite starting material is limited to no greater than 85% of the slit width of the extrusion molding die, at least talc is used as the cordierite starting material, and the mean particle size thereof is 5 m or greater.

If the maximum particle size of the cordierite starting material is smaller than the slit width of the extrusion molding die the starting material particles should not clog between the slits or at the slit introduction port; however, clogging in fact occurs if it is only slightly smaller than the slit width. The present inventors have found cell breakage due to clogging of the starting material particles can be eliminated if the particle size of the starting material is restricted so that the maximum particle size is no greater than 85% of the slit width. However, if the particle size of the starting material is simply reduced, the void volume is also smaller and an effect of lower heat capacity by thickness reduction cannot be achieved. For a lower heat capacity it is preferred for the void volume to be greater than 30%, and according to the first aspect talc with a mean particle size of at least 5 μm is used for this purpose. Talc forms voids by being melted during firing, thus providing an effect of increased void volume. Thus, while talc with a small particle size will disappear by contraction during the firing, if the mean particle size of the talc is at least 5 μm the disappearance of voids can be prevented, to give a honeycomb structural body with a void volume of greater than 30%.

In addition, the thermal expansion coefficient of the cordierite honeycomb structural body can be controlled by utilizing the orientation of the plate-crystal talc particles lined up along the cell walls of the honeycomb during molding of the honeycomb, and it has been found that a larger mean particle size results in easier orientation and a smaller thermal expansion coefficient. Specifically, if the mean particle size of the talc is at least 5 μm, it is possible to limit the thermal expansion coefficient of the cordierite honeycomb structural body to no greater than $1.0 \times 10^{-6}/°$ C., to thus provide increased thermal shock resistance.

Thus, according to the process of the first aspect, it is possible to avoid cell breakage without reducing the void volume, while it is also possible to lower the thermal expansion coefficient to $1.0 \times 10^{-6}/°$ C. or smaller. It thus becomes possible to obtain an easily moldable honeycomb structural body with thin cell walls, a good catalyst carrying property, a low heat capacity and excellent thermal shock resistance.

A lubricant/humectant is preferably added as a molding aid at 2–5 wt % to 100 wt % of the cordierite starting material. Addition of a lubricant/humectant further improves the effect of preventing cell breakage. This is because insertion of a substances with low frictional resistance between the starting material particles increases the distance between the starting material particles, having the effect of lowering the frictional resistance and preventing clogging of the starting material particles in the slits, and therefore the lubricant/humectant is preferably added at a total of 2 wt % or greater. However, if the amount of the lubricant/humectant added is too great the hardness of the starting mixture will be lowered, thus rendering it difficult to maintain the shape of the molded honeycomb structural body. Thus, a range of 2–5 wt % is best to achieve both lower frictional resistance and shape retention.

It is preferred to add a binder as the molding aid at 3–9 wt % to 100 wt % of the cordierite starting material. Addition of a binder will also provide an effect of reducing the frictional resistance to prevent clogging of the starting material particles and thus prevent cell breakage, similar to addition of the lubricant/humectant. The binder may be added in an amount in the range of 3–9 wt % to achieve this effect with shape retention.

The molding aids used to overcome the problem of cell wrinkles when the cell wall thickness is reduced are preferably a mixture of a water-soluble polyhydric alcohol derivative and a polyhydric alcohol, and they are preferably added so that the mixing ratio is represented by the following equation:

mixing ratio=polyhydric alcohol/(water-soluble polyhydric alcohol derivative+polyhydric alcohol) is in the range of 0.895–0.995.

Addition of the mixture of the water-soluble polyhydric alcohol derivative and the polyhydric alcohol with this mixing ratio to the cordierite starting material will improve the cohesion of the starting mixture when shaping the round bar for molding of the honeycomb structural body. It will thus become possible to eliminate the starting material interface in the round bar to prevent generation of cell wrinkles caused thereby. The mixing ratio may be at least 0.895 in order to achieve this effect, but if the mixing ratio exceeds 0.995 the hardness of the starting material will be lowered thus reducing the shape retention property which holds the shape, and leading to generation of warps and the like; the mixing ratio should therefore be in the range of 0.895–0.995.

Thus, according to the method of using a water-soluble polyhydric alcohol derivative and a polyhydric alcohol in this proportion, it is possible to eliminate the starting material interface in the round bar and to mold a honeycomb structural body with a narrow cell wall thickness without producing cell wrinkles.

The second aspect of the invention is a molding aid added to the starting material for a honeycomb structural body during molding of the honeycomb structural body, characterized by comprising a mixture of a water-soluble polyhydric alcohol derivative and a polyhydric alcohol such that the mixing ratio represented by the following equation:

mixing ratio=polyhydric alcohol/(water-soluble polyhydric alcohol derivative+polyhydric alcohol) is in the range of 0.895–0.995.

By using a molding aid containing the mixture of the water-soluble polyhydric alcohol derivative and polyhydric alcohol for molding of a honeycomb structural body, such as a cordierite honeycomb structural body, it is possible to improve the cohesion of the starting material for molding of the honeycomb structural body and prevent generation of cell wrinkles caused by the interface of the starting mixture on the round bar. If the mixing ratio of the water-soluble polyhydric alcohol derivative and polyhydric alcohol is within the range specified above, it is possible to eliminate the interface of the starting mixture on the round bar and thus prevent generation of cell wrinkles in the honeycomb structural body in cases where the honeycomb structural body has narrow cell walls.

BRIEF DESCRIPTION OF THE DRAWINGS

FIG. 2 is a graph showing the relationship between the mean particle size of talc and the thermal expansion coefficient.

FIG. 3 is a graph showing the relationship between the number of moldings and cell breakage.

DESCRIPTION OF THE PREFERRED EMBODIMENT

The present invention will now be explained in detail. A honeycomb structural body fabricated according to the invention has a theoretical composition represented by $2MgO \cdot 2Al_2O_3 \cdot 5SiO_2$, and it usually contains, as the main component, cordierite with a composition comprising a ratio of 49.0–53.0 wt % $SiO_2$, 33.0–37.0 wt % $Al_2O_3$ and 11.5–15.5 wt % MgO. The cordierite honeycomb structural body is obtained by adding and kneading the aforementioned molding aids with the cordierite starting mixture prepared with the desired cordierite composition, and then molding and firing it in a honeycomb shape.

Here, at least talc ($Mg_3Si_4O_{10}(OH)_2$) is used as the cordierite starting material and, in particular, if its mean particle size is at least 5 μm, the void volume of the honeycomb structural body can be increased to over 30%. If the mean particle size of the talc is smaller than 5 μm the voids formed by melting of the talc during firing will disappear by contraction during the firing, making it impossible to obtain an effect of increased void volume. Also, if the mean particle size of the talc is 5 μm or greater it is possible to limit the thermal expansion coefficient of the cordierite honeycomb structural body to no greater than $1.0 \times 10^{-6}$ to thus provide improved thermal shock resistance.

Cordierite starting materials other than talc are not particularly restricted, and kaolin ($Al_2Si_2O_5(OH)_4$), alumina ($Al_2O_3$), aluminum hydroxide ($Al(OH)_3$) and the like are suitable for use. In addition to these there may also be used Mg-based, Al-based and Si-based oxides, hydroxides and chlorides. Such compounds include serpentine ($Mg_3Si_2O_5(OH)_4$), pyroferrite ($Al_2Si_4O_{10}(OH)_2$) and brucite ($Mg(OH)_2$).

When these cordierite starting materials are used to fabricate a cordierite honeycomb structural body, the talc is first combined with the other cordierite starting materials to the desired cordierite composition. According to the invention, the maximum particle size of the cordierite starting material powder containing talc is controlled to be no greater than 85% of the slit width of the mold for extrusion molding. This can prevent clogging of the starting material particles at the slit introduction port or inside the slits, as well as occurrence of cell breakage during extrusion molding.

Figure 1A:
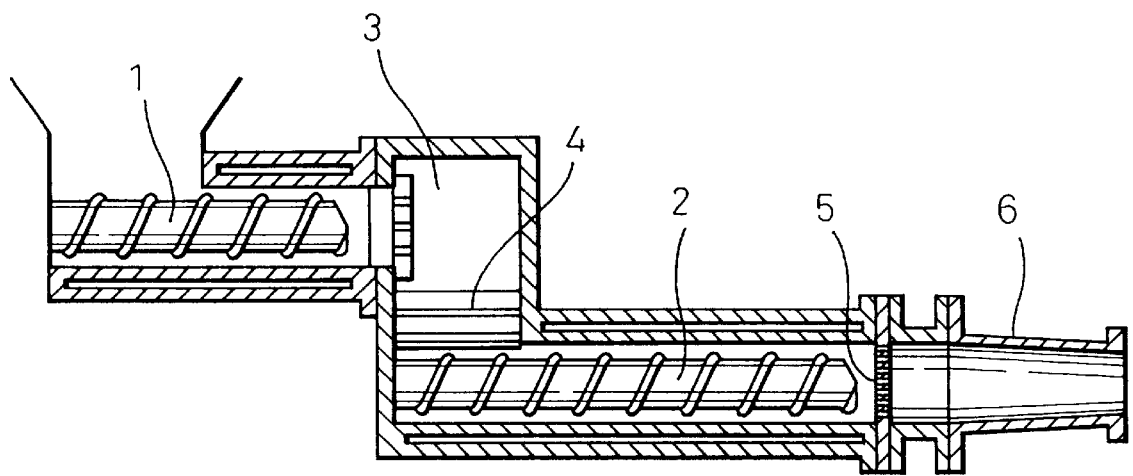
FIG. 1A is a full cross-sectional view of the structure of a tug mill.
Figure 1B:
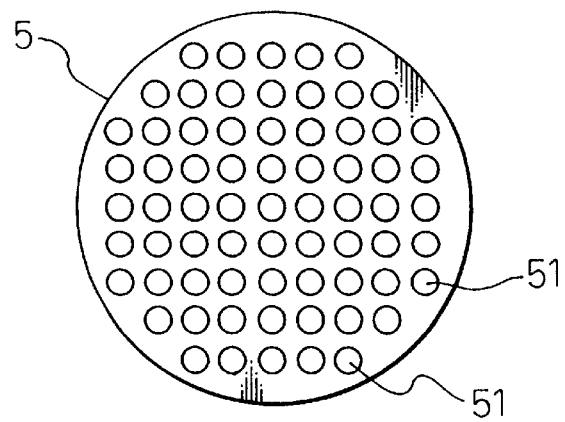
FIG. 1B is a front view of the structure of the resistance plate.

Next, the molding aid is added to and kneaded with the cordierite starting material to prepare a starting mixture for extrusion molding. It is generally preferred to use a screw-type tug mill, as shown in FIG. 1, for the kneading and for molding into a round bar shape. The starting mixture shaped into a round bar is further extrusion molded into a honeycomb shape using a publicly known mold for extrusion molding. The molding aid used may be a common lubricant/humectant, or a binder, etc. Specifically, as lubricant/humectants there may be mentioned waxes, water-soluble polyhydric alcohol derivatives, surfactants, etc. and as binders there may be mentioned methyl cellulose, polyvinyl alcohol and the like.

According to the invention it is possible to minimize cell breakage during extrusion molding by adding the molding aids within specified ranges. Specifically, the lubricant/humectant may be added in a range of 2–5 wt %, and the binder in a range of 3–9 wt %, to 100 wt % of the cordierite starting material. When added to the cordierite starting material, the lubricant/humectant or binder is dispersed between the starting material particles, thus reducing the frictional resistance to provide an effect of preventing clogging of the starting material particles in the slits. This effect is not achieved if the lubricant/humectant is added at less than 2 wt % or the binder is added at less than 3 wt %. However, if the lubricant/humectant or binder is added in too great an amount the hardness of the starting mixture will be lower, making it difficult to retain the shape of the molded honeycomb structural body, and therefore they are preferably not added in excess of the ranges specified above. A lubricant/humectant and binder may be used in combination, and an excellent effect against cell breakage can be achieved when each is within the ranges specified above.

According to the invention, a mixture of a water-soluble polyhydric alcohol derivative and a polyhydric alcohol may be used as a molding aid. For example, as a water-soluble polyhydric alcohol derivative there may be mentioned polyalkylene glycol, etc. and as polyhydric alcohols there may be mentioned glycerin, diethylene glycol, etc. In particular, the starting mixture can be given an improved cohesive property if the water-soluble polyhydric alcohol derivative and polyhydric alcohol are used in such a combination that the mixing ratio as represented by the following equation:

mixing ratio=polyhydric alcohol/(water-soluble polyhydric alcohol derivative+polyhydric alcohol) is in the range of 0.895–0.995. This provides an effect which prevents formation of a starting mixture interface during molding of the round bar for molding of a honeycomb structural body, or generation of cell wrinkles during the honeycomb molding.

If the aforementioned mixing ratio is smaller than 0.895, the cohesive property of the starting mixture as it passes and is pressed through the resistance plate of the tug mill will be insufficient, thus leaving a starting mixture interface in the round bar. A mixing ratio of greater than 0.895 can eliminate the starting mixture interface, but if the mixing ratio is greater than 0.995 the hardness of the starting mixture is reduced, resulting in lower shape retention leading to warping, etc. In other words, if the mixing ratio is in the range of 0.895–0.995 it is possible to eliminate the starting mixture interface while maintaining shape retention, so that it is possible to prevent cell wrinkles caused by the interface.

A mixture of a water-soluble polyhydric alcohol derivative and a polyhydric alcohol mixed in the aforementioned mixing ratio also has an effect as a lubricant/humectant, and can therefore be used as a lubricant/humectant. In this case, the mixture of a water-soluble polyhydric alcohol derivative and a polyhydric alcohol as a lubricant/humectant may be added in the range of preferably 2–5 wt % to 100 wt % of the cordierite starting material to effectively prevent both the cell breakage and cell wrinkles described above.

The honeycomb-shaped mold obtained in this manner is then fired at above the firing temperature of cordierite to obtain a cordierite honeycomb structural body. According to the process of the invention it is possible to fabricate a cordierite honeycomb structural body with thin cell walls, without resulting in cell breakage or cell wrinkles.

The case described above was a molding aid for the first aspect comprising a mixture of a water-soluble polyhydric alcohol derivative and a polyhydric alcohol, used for molding of a cordierite honeycomb structural body; however, the molding aid is not limited to a cordierite honeycomb structural body and can of course be used for molding of other ceramic honeycomb structural bodies (second aspect).

Examples 1 and 2, Comparative Examples 1 to 3

A cordierite starting material was prepared by mixing 38 wt % of talc, 42 wt % of kaolin, 5 wt % of alumina and 15 wt % of aluminum hydroxide, and then 2.8 wt % of a lubricant/humectant, 5.5 wt % of a binder and a suitable amount of water were added to 100 wt % of the cordierite starting material and kneaded to obtain a starting mixture. The mean particle size and maximum particle size of the talc and the maximum particle size of the other starting materials were as shown in Table 1. Here, a 5% aqueous solution of polyalkylene glycol was used as the lubricant/humectant, and methyl cellulose was used as the binder.

The resulting starting mixture was extrusion molded using an extrusion mold with honeycomb-shaped slits. The slit width of the extrusion mold used was 75 μm. The resulting molded product was then fired in an electric furnace at 1390° C. in an air atmosphere to fabricate a cordierite honeycomb structural body. The void volume and presence or absence of cell breakage in each of the resulting cordierite honeycomb structural bodies are listed in Table 1.

TABLE 1

|  | Mean particle size (μm) Talc | Maximum particle size | | | | Cell breakage | Thermal expansion coefficient (× $10^{-6}$/° C.) | Void volume (%) |
| --- | --- | --- | --- | --- | --- | --- | --- | --- |
|  |  | Talc | Kaolin | Alumina | Aluminum hydroxide |  |  |  |
| Comp. Ex. 1 | 17.6 | 60.2 | 67.5 | 26.1 | 6.7 | yes | 0.39 | 35.9 |
| Comp. Ex. 2 | 17.6 | 60.2 | 51.5 | 65.8 | 6.7 | yes | 0.36 | 35.6 |
| Example 1 | 17.6 | 60.2 | 51.5 | 26.1 | 6.7 | no | 0.38 | 34.3 |
| Example 2 | 6.1 | 45.3 | 51.5 | 26.1 | 6.7 | no | 0.89 | 31.6 |
| Comp. Ex. 3 | 4.2 | 30.9 | 51.5 | 26.1 | 6.7 | no | 1.11 | 27.4 |

In Examples 1 and 2 wherein the maximum particle size of the starting material was no greater than 63 μm and the mean particle size of the talc was at least 5 μm as shown in Table 1, no cell breakage was observed and the void volume exceeded 30%. In contrast, cell breakage was observed in Comparative Examples 1 and 2 wherein the maximum particle size of the kaolin and alumina in the cordierite starting material was larger than 85% of the slit width of the extrusion mold (63 μm). In Comparative Example 3 wherein the maximum particle size was less than 63 μm, no cell breakage was observed but the mean particle size of the talc was smaller than 5 μm, and the void volume was less than 30%. In Comparative Examples 1 and 2 wherein the mean particle size of the talc was greater than 5 μm, the void volume was greater than 30%. It was thus demonstrated that cell breakage can be prevented without reducing the void volume, if the maximum particle size of the starting material is no greater than 85% of the slit width and the mean particle size of the talc is at least 5 μm.

The thermal expansion coefficients of the obtained cordierite honeycomb structural bodies were also measured, and are listed in Table 1. Table 1 shows that in Example 1 and Comparative Examples 1 and 2 wherein the mean particle size of the talc was as large as 17.6 μm, the thermal expansion coefficients were small values under $0.4 \times 10^{-6}$/° C. Example 2 wherein the mean particle size of the talc was as small as 6.1 μm had a thermal expansion coefficient of $0.89 \times 10^{-6}$/° C. which was larger than Example 1, but this was smaller than the usable limit of $1.0 \times 10^{-6}$/° C. However, in Comparative Example 3 wherein the mean particle size was 4.2 μm, or smaller than 5 μm, the thermal expansion coefficient was $1.11 \times 10^{-6}$/° C. which exceeded the usable limit of $1.0 \times 10^{-6}$/° C., and resulted in poor thermal shock resistance of the cordierite honeycomb structural body. FIG. 2 is a graph showing the relationship between the mean particle size of the talc and the thermal expansion coefficient, based on the results given above, and it shows that with a talc mean particle size of 5 μm it is possible to limit the thermal expansion coefficient to no greater than $1.0 \times 10^{-6}$/° C. for improved thermal shock resistance.

Next, talc, kaolin, alumina and aluminum hydroxide with the same mean particle size, maximum particle size and weight ratios as in Example 1 were used as cordierite starting materials (see Table 1), changing the amount of lubricant/humectant added and the amount of binder added to 100 wt % of cordierite starting material according to (condition 1) to (condition 5) listed in Table 2, and the effects thereof were examined.

TABLE 2

|  | Amount added (wt %) | |
|---|---|---|
|  | Lubricant/humectant | Binder |
| ∇: Condition 1 | 1.8 | 2.7 |
| ◇: Condition 2 | 1.8 | 5.5 |
| △: Condition 3 | 4.2 | 2.7 |
| ○: Condition 4 | 2.8 | 5.5 |
| : Condition 5 | 5.2 | 9.5 |

FIG. 3 shows the relationship between the number of moldings and the cell breakage when the resulting starting mixture was extrusion molded into a 155-mm long honeycomb mold using an extrusion mold with a slit width of 75 μm.

The results shown in FIG. 3 show that when the amount of lubricant/humectant added is less than 2 wt % and the amount of binder added is less than 3 wt % (condition 1), no cell breakage is observed with up to 2 moldings, but some cell breakage is observed with 3 or more. When the amount of lubricant/humectant added is less than 2 wt % and the amount of binder added is 3–9 wt % (condition 2), or the amount of lubricant/humectant added is 2–5 wt % and the amount of binder added is less than 3 wt % (condition 3), no cell breakage is observed with up to 4 moldings, but some cell breakage is observed with 5 or more. When the amount of lubricant/humectant added is 2–5 wt % and the amount of binder added is 3–9 wt % (condition 4), absolutely no cell breakage is observed with up to 6 moldings. When the amount of lubricant/humectant added is greater than 5 wt % and the amount of binder added is greater than 9 wt % (condition 5), no cell breakage was observed with up to 6 molded rods, but the starting mixture becomes soft, and this led to easier deformation of the molded honeycomb structural body.

Thus, it is preferred for the amount of lubricant/humectant added to be in the range of 2–5 wt %, and the amount of the binder added to be in the range of 3–9 wt %, for an excellent effect of preventing cell breakage. It is also clear that cell breakage is even further minimized if the lubricant/humectant and the binder are used in combination in the ranges specified above.

Examples 4 to 6, Comparative Examples 4 to 8.

An experiment was conducted to determine the effect of using mixtures of water-soluble polyhydric alcohol derivatives and polyhydric alcohols as molding aids with cordierite starting materials. The cordierite starting materials used were talc, kaolin, alumina and aluminum hydroxide with the same mean particle sizes, maximum particle sizes and weight ratios as in Example 1 (see Table 1), and then 2.8 wt % of a lubricant/humectant, 5.5 wt % of methyl cellulose as a binder and a suitable amount of water were added to 100 wt % of the cordierite starting material, and kneaded to prepare a round bar-shaped starting mixture. The lubricant/humectant used was a water-soluble polyhydric alcohol derivative and polyhydric alcohol, or either alone, with the different mixing ratios listed in Table 3. A 5% aqueous solution of polyalkylene glycol was used as the water-soluble polyhydric alcohol derivative, and glycerin or diethylene glycol was used as the polyhydric alcohol.

Each of the resulting round bars was extrusion molded using a mold for extrusion molding with a 75 μm slit width, to obtain a honeycomb structural body. The presence or absence of starting mixture interfaces on the round bars and the shape retentions were examined, giving the results listed in Table 3. Here, the presence or absence of starting mixture interfaces on the round bars were evaluated based on whether or not non-continuous sections of the starting mixture were present when a 10-mm thick disk sliced from the round bar was bent. Samples with interfaces are indicated by "B", and those without by "G". The shape retention was evaluated by the state of peripheral deformation when the honeycomb structural body was molded. Samples with no deformation are indicated by "G" and those without by "B".

TABLE 3

|  | Ceramic starting material | Methyl cellulose | Water-soluble polyhydric alcohol derivative | Polyhydric alcohol | Mixing ratio | Interface | Shape retention |
|---|---|---|---|---|---|---|---|
| Comp. Ex. 4 | 100 wt % | 5.5 wt % | 5 wt % aqueous solution of polyalkylene glycol derivative 2.80 wt % | — | 0.000 | B | G |
| Comp. Ex. 5 | " | " | 5 wt % aqueous solution of polyalkylene glycol derivative 2.10 wt % | glycerin 0.70 wt % | 0.870 | B | G |
| Comp. Ex. 6 | " | " | 5 wt % aqueous solution of polyalkylene glycol derivative 2.10 wt % | diethylene glycol 0.70 wt % | 0.870 | B | G |

TABLE 3-continued

|  | Ceramic starting material | Methyl cellulose | Water-soluble polyhydric alcohol derivative | Polyhydric alcohol | Mixing ratio | Interface | Shape retention |
|---|---|---|---|---|---|---|---|
| Example 3 | " | " | 5 wt % aqueous solution of polyalkylene glycol derivative 1.96 wt % | glycerin 0.84 wt % | 0.896 | G | G |
| Example 4 | " | " | 5 wt % aqueous solution of polyalkylene glycol derivative 0.84 wt % | glycerin 1.96 wt % | 0.979 | G | G |
| Example 5 | " | " | 5 wt % aqueous solution of polyalkylene glycol derivative 0.84 wt % | diethylene glycol 1.96 wt % | 0.979 | G | G |
| Example 6 | " | " | 5 wt % aqueous solution of polyalkylene glycol derivative 2.80 wt % | glycerin 2.52 wt % | 0.994 | G | G |
| Comp. Ex. 7 | " | " | — | glycerin 2.80 wt % | 1.000 | G | B |
| Comp. Ex. 8 | " | " | — | diethylene glycol 2.80 wt % | 1.000 | G | B |

In Comparative Example 4 wherein the 5% aqueous solution of polyalkylene glycol was added at 2.8 wt % and no polyhydric alcohol was added, with a mixing ratio of 0 as shown in Table 3, the shape retention was satisfactory but the presence of an interface resulted in cell wrinkles at the sections corresponding to the interface. In Comparative Example 5 wherein the 5% aqueous solution of polyalkylene glycol was added at 2.1 wt % and glycerin at 0.7 wt % as the polyhydric alcohol, with a mixing ratio of 0.870, the round bar interface was reduced but was not sufficiently minimized, and cell wrinkles corresponding to the interface were observed in the honeycomb structural body molded using the round bar.

In contrast, in Example 3 wherein the 5% aqueous solution of polyalkylene glycol was added at 1.96 wt % and glycerin at 0.84 wt %, with a mixing ratio of 0.896, no non-continuous sections were found in starting mixture upon bending of a disk sliced from the round bar, and the interface in the round bar disappeared. Also, no cell wrinkles corresponding to the interface were observed when the round bar was used for a honeycomb structural body. Examples 4 and 6 wherein the mixing ratio was from 0.895 to 0.995 also exhibited no cell wrinkles corresponding to the round bar interface, and shape retention was maintained.

Figure 4:
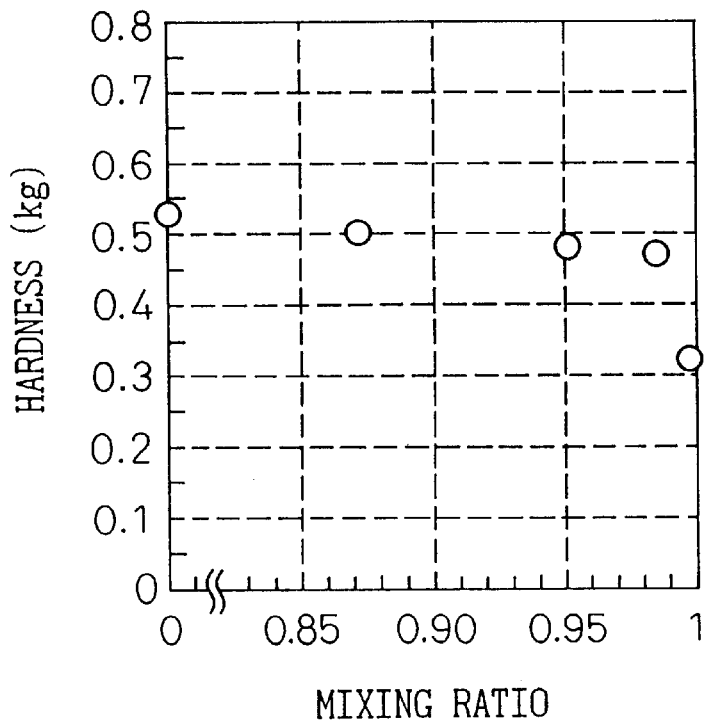
FIG. 4 is a graph showing the relationship between the mixing ratio and the starting mixture hardness.
Figure 5:
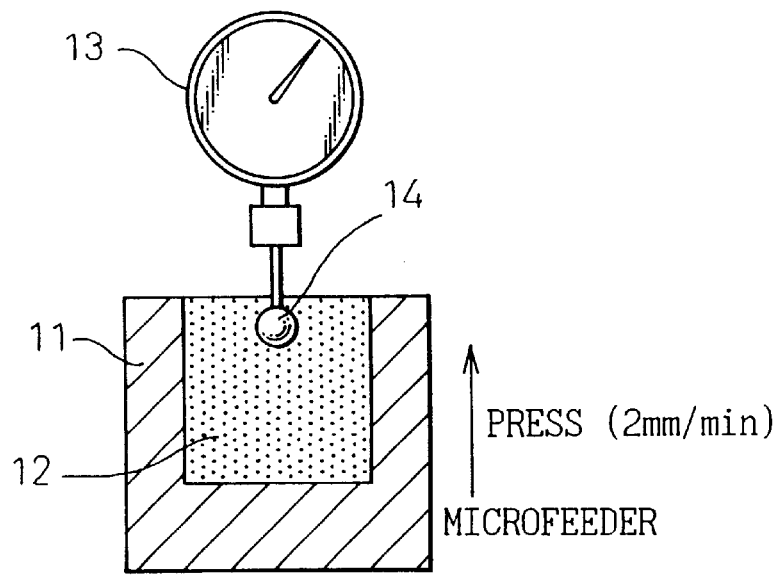
FIG. 5 is an illustration of a method of evaluating the starting material hardness.

However, when the mixing ratio exceeded 0.995, for example in Comparative Example 7 with a mixing ratio of 1 wherein no 5% aqueous solution of polyalkylene glycol was used and glycerin was added 2.8 wt %, no cell wrinkling was observed corresponding to the round bar interface, but the starting mixture was soft resulting in low shape retention, and therefore deformation occurred in the honeycomb structural body. FIG. 4 shows the relationship between the mixing ratio and the starting mixture hardness, where it is seen that a larger mixing ratio with glycerin results in a gradually softening starting mixture hardness, but with a mixing ratio of greater than 0.995 it becomes drastically softer, contributing to lower shape retention of the honeycomb structural body. The hardness of the starting mixture was determined, as shown in FIG. 5, by filling a holder 11 having an inner diameter of 24 mm and a depth of 25 mm with about 20 g of the starting mixture, completely burying a steel ball having a diameter of 4 mm attached to the tip of a push-pull gauge 13, moving the holder in the direction of the steel ball at a rate of 2 mm/min with a micro feeder, not shown in the figure, to thereby press the starting material to the steel ball, and then reading the starting mixture hardness as the load indicated by the gauge after one minute.

The same results for the mixing ratio with polyalkylene glycol, the presence or absence of the round bar interface and changes in the shape retention of the honeycomb structural body were obtained even when diethylene glycol was used instead of glycerin as the polyhydric alcohol (Example 5, Comparative Examples 6 and 8).

What is claimed is:

1. A process for producing a honeycomb structural body composed mainly of cordierite which comprises adding a molding aid to a powder of a cordierite starting material, wherein said molding aid used is a mixture of polyalkylene glycol and a polyhydric alcohol selected from the group consisting of glycerin and diethylene glycol such that the mixing ratio represented by the following equation: mixing ratio=polyhydric alcohol/ (polyalkylene glycol+polyhydric alcohol) is in the range of 0.895–0.995, kneading the mixture and extrusion molding if the an extrusion molding die with honeycomb-shaped slits, and then firing it, wherein the maximum particle size of the powder of said cordierite starting material is limited to no greater than 85% of the slit width of said extrusion molding die, at least talc is used as said cordierite starting material, and the mean particle size thereof is 5 mm or greater.

2. A process for producing a honeycomb structural body according to claim 1, wherein a lubricant/humectant is added as said molding aid at 2–5 wt % with respect to 100 wt % of said cordierite starting material.

3. A process for producing a honeycomb structural body according to claim 1, wherein a binder is added as said molding aid at 3–9 wt % with respect to 100 wt % of said cordierite starting material.

4. A process for producing a honeycomb structural body according to claim 2, wherein a binder is added as said molding aid at 3–9 wt % with respect to 100 wt % of said cordierite starting material.

* * * * *